US012027307B2

(12) United States Patent
Wang et al.

(10) Patent No.: US 12,027,307 B2
(45) Date of Patent: Jul. 2, 2024

(54) METHOD FOR INCREASING THE COERCIVITY OF A SINTERED TYPE NdFeB PERMANENT MAGNET

(71) Applicant: Yantai Shougang Magnetic Materials Inc, Shandong (CN)

(72) Inventors: Chuanshen Wang, Shandong (CN); Kunkun Yang, Shandong (CN); Zhongjie Peng, Shandong (CN); Daoning Jia, Shandong (CN); Kaihong Ding, Shandong (CN)

(73) Assignee: Yantai Shougang Magnetic Materials Inc, Shandong (CN)

( * ) Notice: Subject to any disclaimer, the term of this patent is extended or adjusted under 35 U.S.C. 154(b) by 800 days.

(21) Appl. No.: 16/953,383

(22) Filed: Nov. 20, 2020

(65) Prior Publication Data

US 2021/0166870 A1 Jun. 3, 2021

(30) Foreign Application Priority Data

Nov. 28, 2019 (CN) ......................... 201911194387.8

(51) Int. Cl.
*H01F 41/02* (2006.01)
*H01F 1/057* (2006.01)

(52) U.S. Cl.
CPC ....... *H01F 41/0293* (2013.01); *H01F 1/0577* (2013.01)

(58) Field of Classification Search
CPC ............................ H01F 41/0293; B22F 1/052
See application file for complete search history.

(56) References Cited

U.S. PATENT DOCUMENTS

| | | | | |
|---|---|---|---|---|
| 8,801,870 | B2 * | 8/2014 | Sagawa | H01F 41/005 427/127 |
| 2012/0252963 | A1 * | 10/2012 | Minko | B05D 1/06 524/556 |
| 2018/0301266 | A1 | 10/2018 | Ou et al. | |

FOREIGN PATENT DOCUMENTS

| | | | | | |
|---|---|---|---|---|---|
| CN | 104043834 | A | | 9/2014 | |
| CN | 105368100 | A | | 3/2016 | |
| CN | 108511179 | A | * | 9/2018 | B22F 3/1007 |
| JP | 2004359873 | A | * | 12/2004 | B05C 3/08 |
| JP | 2006233277 | A | | 9/2006 | |

* cited by examiner

*Primary Examiner* — Samir Shah
*Assistant Examiner* — Sean P. O'Keefe
(74) *Attorney, Agent, or Firm* — Samson G. Yu

(57) ABSTRACT

The present disclosure provides a method for increasing the coercivity of a sintered type NdFeB permanent magnet. The method comprises:

a) coating of a slurry on a surface of the magnet, the slurry comprising first particles consisting of a heavy rare earth alloy or a heavy rare earth or a non-metallic compound, and second particles consisting of a metal alloy or a meta, wherein at least one of the first particles and second particles includes at least one of Dy and Tb and wherein a ratio of the average particle diameter between the second particles and the first particles is 2:1 to 20:1;

b) performing a vibration of the coated magnet in vertical direction of the applied slurry with a vibration frequency of 10 Hz to 50 Hz for 30 s to 5 min, then drying the slurry; and c) performing a thermally induced grain boundary diffusion process.

8 Claims, 1 Drawing Sheet

METHOD FOR INCREASING THE COERCIVITY OF A SINTERED TYPE NdFeB PERMANENT MAGNET

TECHNICAL FIELD

The disclosure relates to improving performance of Sintered type NdFeB permanent magnets, and more specifically is about increasing coercivity of sintered type NdFeB permanent magnets.

BACKGROUND

Sintered type NdFeB permanent magnets, known as king of magnetics, have been widely used in many technical fields like memory equipment, electronic components, new energy automobiles, robots and so on. With the development of informatization and industrialization, high coercivity of sintered type NdFeB permanent magnets have been the hotspot of research.

In 2005, Nakamura reported a simple and rapid way to increase coercivity by adding heavy rare-earth oxides and fluoride powders, which is called "grain boundary diffusion technique". With the development of diffusion technology, two diffusion mechanisms are formed, that is, hardening $Nd_2Fe_{14}B$ main phase with heavy rare earth elements to the form a large number of core-shell structures or broadening and diluting grain boundary of ferromagnetic phase.

There are many methods of diffusion treatment, such as vapor deposition, coating, electrophoretic deposition, electroplating and so on. Vapor deposition can effectively increase the coercivity of sintered type NdFeB permanent magnets. But the disadvantages are lower productivity, high cost, lower utilization rate of heavy rare earth, expensive equipment and hard to scale production. Although the method of electrophoretic deposition has high productivity, all the surfaces of the Sintered type NdFeB permanent magnets will be coated by films of deposited heavy rare earth. On one hand, it will lead to the waste of heavy rare earth and the reduction of remanence markedly. On the other hand, it will lead to pollution, complicated processes and easily oxidation. It is hard to use the electroplating method in industrial production for high costs, pollution, process complications and oxidation of the heavy rare earth film.

A conventional coating method is to mix powders of rare earth powders and organic compounds to form a slurry, then coating it on the surface of sintered type NdFeB permanent magnets. But the method has many disadvantages. Firstly, ratios of heavy rare earth powders and organic compounds dramatically change during the volatilization of the solvent. Secondly, there are many uncontrollable factors, for example, organic compounds are easy to react with metal powder. Thirdly, composite metal coating is usually at least a twice coating process, resulting in worse adhesion, shedding, and frequent inconsistencies thickness of films. Fourthly, the film is easy to oxide and falls off from the surface of sintered type NdFeB permanent magnets leading to insufficient diffusion process. Fifthly, the mixed metal powders are easy to precipitate and agglomerate.

CN107578912A, CN104112580A, CN107026003A, CN107492430A, CN105761861A disclose that suspensions made of alcohol, gasoline and paint can be coated on the surface of sintered type NdFeB permanent magnets and then diffused, but this method is extremely difficult for mass production due to its characteristics of easy volatility, high toxicity and poor controllability. CN109390145A proposes that another layer of inorganic coating was applied on the surface of sintered type NdFeB permanent magnets for preventing oxidation of heavy rare earth coating. However, the method will lead to increase procedures of production and high production cost. CN108039259A discloses that three metal layers of heavy rare earth layer, heavy rare earth alloy layer or non-rare earth metal layer or non-rare earth alloy layer by vapor deposition are produced. But the method includes complicated procedures, many parameters to be considered and high production costs.

SUMMARY OF THE DISCLOSURE

For overcoming deficiencies of the prior art, the present disclosure provides a method of increasing coercivity of sintered type NdFeB permanent magnets. The light rare earth alloy particles and heavy rare earth particles or heavy rare earth alloy particles or non-metallic particle in the coating liquid film can be formed into layered integral coating film by specific conditions. It can greatly improve performance of sintered type NdFeB permanent magnets, maintain consistency of performance, reduce production process, improve the material utilization and reduce the cost.

The present disclosure provides a method for increasing the coercivity of a sintered type NdFeB permanent magnet. The method comprises the following steps:

a) coating of a slurry on a surface of the sintered type NdFeB permanent magnet, the slurry comprising
first particles consisting of a heavy rare earth alloy or a heavy rare earth or a non-metallic compound, the first particles having an average particle diameter of 0.5 μm to 75 μm, and
second particles consisting of a metal alloy or a metal, the second particles having an average particle diameter of 0.5 μm to 150 μm,
wherein at least one of the first particles and second particles includes at least one of Dy and Tb and wherein a ratio of the average particle diameter of the second particles to the average particle diameter of the first particles is in the range of 2:1 to 20:1;

b) performing a vibration of the coated magnet in vertical direction of the applied slurry with a vibration frequency of in the range of 10 Hz to 50 Hz for a duration of 30s to 5 min, then drying the slurry; and c) performing a thermally induced grain boundary diffusion process.

According to one embodiment, the metal for the second particles is one of Tb, Dy, Ho, Gd, Pr, Nd, La, Ce, Cu, Al, Zn, Mg, Ga and Sn. The metal alloy for the second particles may be an alloy formed by two or more metals selected from the group consisting of Tb, Dy, Ho, Gd, Pr, Nd, La, Ce, Cu, Al, Zn, Mg, Ga and Sn.

According to another embodiment, the heavy rare earth metal for the first particles is one of Dy, Tb, Ho and Gd. The metal alloy for the first particles may be an alloy formed by at least one of the heavy rare earth metals one of Dy, Tb, Ho and Gd and one or more metals selected from the group consisting of Pr, Nd, La, Ce, Cu, Al, Ga, Mg, Co, Ti, Fe.

According to another embodiment, the first particles consist of Dy and the second particles consist of $Pr_{82}Al_{18}$ (at %).

According to another embodiment, the non-metallic compound is one of alumina, titanium dioxide, zirconia, silicon oxide, rare earth fluoride, rare earth oxide, silicon carbide, zirconium carbide, tungsten carbide, sodium titanate, potassium titanate, calcium carbonate.

According to another embodiment, the slurry has a viscosity in the range of 100 CPS to 4000 CPS measured by a rotational viscosimeter at 20° C. (e.g. digital viscometer NDJ-5S/8S of Shanghai Lichen-BX Instrument Technology Co., Ltd.).

According to another embodiment, the slurry has a density in the range of 2.0 to 5.0 g/cm3.

According to another embodiment, the drying in step b) is performed at a temperature of 0° C. to 180° C.

According to another embodiment, the grain boundary diffusion process of step c) includes a first heat treatment step at 450° C. to 750° C. for 1 h to 3 h, a second a first heat treatment step at 750° C. to 950° C. for 6 h to 72 h, and an aging step at 400° C. to 650° C. for 3 h to 15 h.

The technical scheme of another embodiment may be characterized in that follows:

a. A viscous liquid film (or slurry), which contains large particles and small particles is coated on the surface of sintered type NdFeB permanent magnet. Small particles move upward and large particles move downward in the viscosity liquid film through an osmotic pressure gradient in an evaporation process under static state or vertical vibration. The particles in the viscosity liquid film may be layered to form a small particles layer and a large particles layer. The small particle is a heavy rare earth alloy particle or a heavy rare earth particle or a non-metallic particle, and the large particle is a metal particle or a metal alloy particle;
b. After low temperature drying, each small particle in small particle layer and each large particle in large particle layer form particles with coated organic structure. The large particle film and small particle film form a layered structure in viscosity liquid film.
c. The large particles open the grain boundary under low temperature diffusion, and the small particles enter the grain boundary or stay on the surface of sintered type NdFeB permanent magnets to form an anti-corrosion layer through high temperature heat treatment, and then aging treatment is carried out.

Furthermore, the number of small particles may be more than 200 times that of large particles.

The vibration frequency of the slurry may range from 20 Hz to 50 Hz.

An organic solvent being present in the slurry may be volatilized by low temperature drying or may occur due to a polymerization in the slurry or crosslinking process in the slurry induced by ultraviolet radiation.

Furthermore, the slurry may comprise as solvents (diluents) alkanes, solvents esters(e.g. ethyl acetate), ketone solvents (e.g. acetone) and solvents alcohol solvents (e.g. ethanol).

The slurry may further include one or more of organic silicon, polyurethane, acrylate resin, or curing adhesive.

Furthermore, drying may be preformed at low-temperature of 0 to 180° C.

Compared to prior technology, its distinguishing features and obvious advantages are as follows:

Powders under the parameters of ratio of diameters, sizes or the vertical vibration frequency probably become a layered structure in the viscosity liquid film. The particles may have a coated structure including an organic shell after low temperature treatment. The coated particles can be preserved in the air for a long time, and after curing, they fit tightly with the sintered type NdFeB permanent magnet and diffuse evenly.

The thickness of film coated on the surface of sintered type NdFeB permanent magnets can be precisely controlled, ensuring a high utilization rate a of heavy rare earth metals.

Due to the particles may be covered by an organic film, they have strong oxidation resistance and can be stored for 96 to 336 hours under air conditions and have good adhesion characteristics. The adhesion on the sintered type NdFeB permanent magnets can reach 5-15 MPa.

DETAILED DESCRIPTION OF THE DISCLOSURE

The principles and features of the disclosure are described below, and the examples are only intended to be illustrated and not to limit the scope of the disclosure as defined by the present claims.

The average particle diameter of the particles may be for example measured by a laser diffraction device using appropriate particle size standards. Specifically, the laser diffraction device is used to determine the particle diameter distribution of the particles, and this particle distribution is used to calculate the arithmetic average of particle diameters. Throughout the specification, the average particle diameter refers to average particle diameter D50 and may be simply denoted as 'size'.

The viscosity is measured by a rotational viscosimeter at 20° C. (e.g. digital viscometer NDJ-5 S/8 S of Shenzen Meter Times Technology Co., Ltd.). The Digital viscometer is used to determine the viscosity, that is to say, when the rotor rotates in slurry at constant speed, the slurry produces a viscosity torque acting on the rotor. The greater of the viscosity in slurry, the greater the viscous torque.

Figure 1:
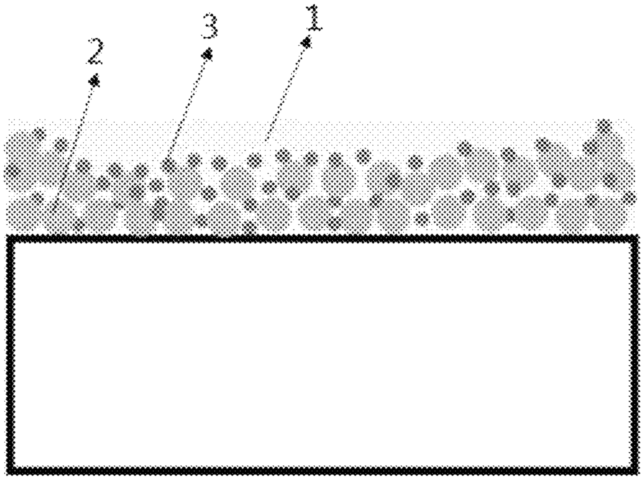
FIG. 1 is an illustration of a slurry coated on a sintered magnet.
Figure 2:
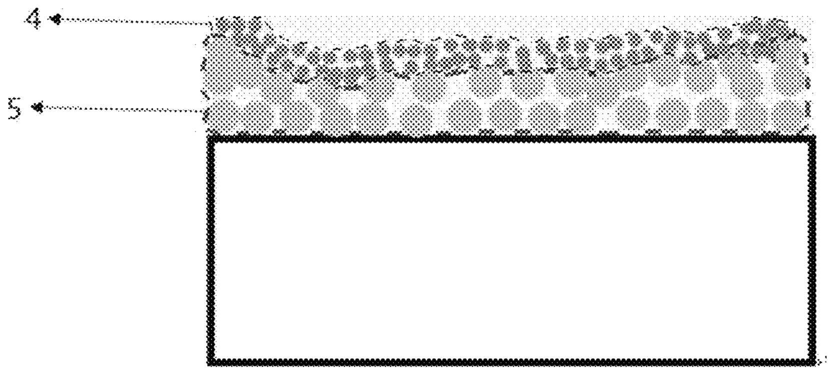
FIG. 2 schematically illustrates the slurry after vertical vibration of the magnet.
Figure 3:
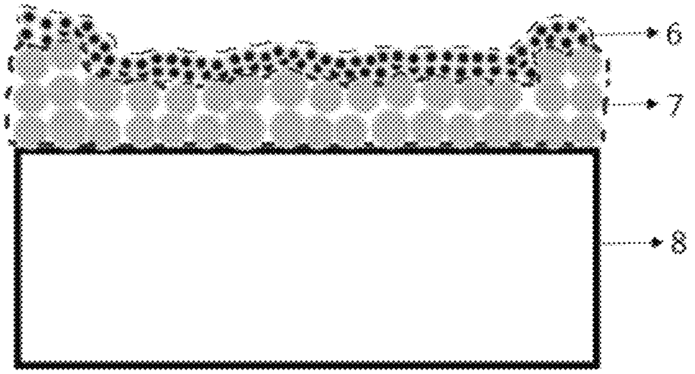
FIG. 3 is an illustration of a solidified slurry forming an organic film cured by low temperature heating.

The present disclosure provides a method for increasing the coercivity of a sintered type NdFeB permanent magnet. The method comprises the following steps, wherein steps a) and b) are schematically illustrated in FIGS. 1-3:

a) Coating of a slurry 1 on a surface of the sintered type NdFeB permanent magnet 8. The slurry 1 comprises
first particles 3 consisting of a heavy rare earth alloy or a heavy rare earth or a non-metallic compound, the first particles 3 having an average particle diameter of 0.5 μm to 75 μm, and
second particles 2 consisting of a metal alloy or a metal, the second particles 2 having an average particle diameter of 0.5 μm to 150 μm, wherein at least one of the first particles 3 and second particles 2 includes at least one of Dy and Tb and wherein a ratio of the average particle diameter of the second particles 2 to the average particle diameter of the first particles 3 is in the range of 2:1 to 20:1. The coated slurry 1 is schematically illustrated in FIG. 1.
b) Performing a vibration of the coated magnet 8 in vertical direction of the applied slurry 1 with a vibration frequency of in the range of 10 Hz to 50 Hz for a duration of 30s to 5 min particles 3. See FIG. 2, where the first particles 3 and second particles 2 are separated in a first layer 4 including the first particles 3 and a second layer 5 including the second particles 2 by the vibration step. Then the slurry 1 is dried forming a first film 6 and a second film 7, which is schematically illustrated in FIG. 3.

c) Performing a thermally induced grain boundary diffusion process.

The schematic illustration in the figures serves only to show a possible effect of vertical vibration. However, the actual effects may vary.

EXAMPLE 1

A mixed slurry whose density is 4.1 g/cm$^3$ is prepared as follows:

$Pr_{82}Al_{18}$ (at %) powder whose average particle size D50 is 6 μm is used as (large) second particles 2. Dy powder whose average particle size D50 is 3 μm are used as (first) small particles 3. The viscosity of the slurry is 3500 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 10 h at 900° C. After that, the magnet was cooled in the furnace and continued to heat up for 3 h at 500° C.

As to Example 1, test results of magnetic properties of the sintered NdFeB permanent magnet are shown in Table 1:

TABLE 1

| | Br (T) | Hcj(kA/m) | Hk/Hcj |
|---|---|---|---|
| Original example | 1.38 | 1488.52 | 0.98 |
| Example 1 | 1.368 | 2020.25 | 0.97 |

Table 1 shows that the remanence of Example 1 decreases by 0.012 T, the coercivity increases by 531.7 kA/m, and the squareness changes only little.

EXAMPLE 2

A mixed slurry whose density is 3.5 g/cm$^3$ is prepared as follows:

$Nd_{70}Cu_{30}$ (at %) powder whose average particle size D50 is 8 μm is used as (large) second particles 2. $Tb_{70}Cu_{30}$ (at %) powder whose average particle size D50 is 3 μm are used as (first) small particles 3. The viscosity of the slurry is 3500 CPS.

The slurry is composed of Butyl acetate (12 wt. %), butanol (8 wt. %), acrylate resin (15 wt. %), $Nd_{70}Cu_{30}$ powder (5 wt. %), $Tb_{70}Cu_{30}$ powder (60 wt. %)

A sintered type NdFeB permanent magnet with a volume of 20×20×3 T is coated with the slurry. The surface in the direction of c-axis of the magnet should be close to the slurry and the coating has a thickness of 26 μm. The vertical vibration frequency applied to the coated magnet is 35 Hz. After 1 minute of vibration, the composite film layer is dried at 150° C. Another surface in the direction of c-axis is also coated with the slurry and is treated in the same way.

The NdFeB sintered permanent magnet covered with the dried film of the slurry was sent to a sintering furnace for 30 h at 880° C. After that, the magnet was cooled in the furnace and continued to heat up for 6 h at 520° C.

As to Example 2, test results of magnetic properties of sintered NdFeB permanent magnet are shown in Table 2:

TABLE 2

| | Br (T) | Hcj(kA/m) | Hk/Hcj |
|---|---|---|---|
| Original example | 1.412 | 1327.7 | 0.98 |
| Example 2 | 1.39 | 2236.8 | 0.97 |

Table 2 shows that the remanence of Example 2 decreases by 0.022 T, the coercivity increases by 909.1 kA/m, and the squareness changes only little.

EXAMPLE 3

A mixed slurry whose density is 4.5 g/cm$^3$ is prepared as follows:

$La_{71}Cu_{29}$ (at %) powder whose average particle size D50 is 20 μm is used as (large) second particles 2. $Dy_{40}Al_{30}Cu_{30}$ (at %) powder whose average particle size D50 is 1 μm are used as (first) small particles 3. The viscosity of the slurry is 4000 CPS.

The slurry is composed of Cyclohexanone (12 wt. %), ethyl acetate (8 wt. %), epoxy resin (15 wt. %), $La_{71}Cu_{29}$ powder (5 wt. %), $Dy_{40}Al_{30}Cu_{30}$ powder (60 wt. %)

A sintered type NdFeB permanent magnet with a volume of 20×20×6 T is coated with the slurry. The surface in the direction of c-axis of the magnet should be close to the slurry and the coating has a thickness of 40 μm. The vertical vibration frequency applied to the coated magnet is 20 Hz. After 80 seconds of vibration, the slurry is dried at 130° C. Another surface in the direction of c-axis is also coated with the slurry and is treated in the same way.

The NdFeB sintered permanent magnet covered with the dried film of the slurry was sent to a sintering furnace for 48 h at 850° C. After that, the magnet was cooled in the furnace and continued to heat up for 8 h at 600° C.

As to Example 3, test results of magnetic properties of the sintered NdFeB permanent magnet are shown in Table 3:

TABLE 3

| | Br (T) | Hcj(kA/m) | Hk/Hcj |
|---|---|---|---|
| Original Example | 1.39 | 1496.5 | 0.98 |
| Example 3 | 1.38 | 2236.8 | 0.96 |

Table 3 shows that the remanence of Example 3 decreases by 0.01 T, the coercivity increases by 740.3 kA/m, and the squareness changes only little.

EXAMPLE 4

A mixed slurry whose density is 4.3 g/cm$^3$ is prepared as follows:

$Dy_{40}Al_{30}Cu_{30}$ (at %) powder whose average particle size D50 is 20 μm is used as (large) second particles 2. Aluminium oxide powder whose average particle size D50 is 2 μm are used as (first) small particles 3. the viscosity of the slurry is 3700 CPS.

The slurry is composed of Cyclohexanone (10 wt. %), ethyl acetate (10 wt. %), resinized rubber(10 wt. %), $Dy_{40}Al_{30}Cu_{30}$ (at %) powder (40 wt. %), Aluminium oxide powder (30 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 40 Hz. After 50 seconds of vibration, the slurry is dried at 80° C. Another surface in the direction of c-axis is also coated with the slurry and is treated in the same way.

The NdFeB sintered permanent magnet covered with the dried film of the slurry was sent to a sintering furnace for 24 h at 900° C. After that, the magnet was cooled in the furnace and continued to heat up for 10 h at 650° C.

As to Example 4, test results of magnetic properties of the sintered NdFeB permanent magnet are shown in Table 4:

TABLE 4

| | Br (T) | Hcj(kA/m) | Hk/Hcj |
|---|---|---|---|
| Original Example | 1.395 | 1448.7 | 0.97 |
| Example 4 | 1.37 | 2031.4 | 0.96 |

Table 4 shows that the remanence of Example 4 decreases by 0.025T, the coercivity increases by 582.7 kA/m, and the squareness changes only little.

EXAMPLE 5

A mixed slurry whose density is 4.1 g/cm$^3$ is prepared as follows:

$Pr_{82}Al_{18}$ (at %) powder whose average particle size D50 is 6 μm is used as (large) second particles 2. Dy powder whose average particle size D50 is 3 μm are used as (first) small particles 3. The viscosity of the slurry is 3500 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 2 h at 650° C. and 10 h at 900° C. After that, the magnet was cooled in the furnace and continued to heat up for 3 h at 500° C.

As to Example 5, test results of magnetic properties of the sintered NdFeB permanent magnet are shown in Table 5:

TABLE 5

| | Br (T) | Hcj(kA/m) | Hk/Hcj |
|---|---|---|---|
| Original Example | 1.38 | 1448.5 | 0.98 |
| Example 5 | 1.36 | 2085.5 | 0.97 |

Table 5 shows that the remanence of Example 5 decreases by 0.01 T, the coercivity increases by 637 kA/m, and the squareness changes only little.

EXAMPLE 6

A mixed slurry whose density is 4.1 g/cm$^3$ is prepared as follows:

$Pr_{82}Al_{18}$ (at %) powder whose average particle size D50 is 4 μm is used as (large) second particles 2. Dy powder whose average particle size D50 is 1 μm are used as (first) small particles 3. The viscosity of the slurry is 3200 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 2 h at 650° C. and 10 h at 900° C. After that, the magnet was cooled in the furnace and continued to heat up for 3 h at 500° C.

As to Example 6, test results of magnetic properties of the sintered NdFeB permanent magnet are shown in Table 6:

TABLE 6

| | Br (T) | Hcj(kA/m) | Hk/Hcj |
|---|---|---|---|
| Original Example | 1.38 | 1488.5 | 0.98 |
| Example 6 | 1.365 | 2053.7 | 0.97 |

Table 6 shows that the remanence of Example 6 decreases by 0.015T, the coercivity increases by 565.2 kA/m, and the squareness changes only little.

EXAMPLE 7

A mixed slurry whose density is 4.15 g/cm$^3$ is prepared as follows:

$Pr_{82}Al_{18}$ (at %) powder whose average particle size D50 is 8 μm is used as (large) second particles 2. Dy powder whose average particle size D50 is 1 μm are used as (first) small particles 3. The viscosity of the slurry is 3600 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 2 h at 650° C. and 10 h at 900° C. After that, the magnet was cooled in the furnace and continued to heat up for 3 h at 500° C.

As to Example 7, test results of magnetic properties of the sintered NdFeB permanent magnet are shown in Table 7:

TABLE 7

| | Br (T) | Hcj(kA/m) | Hk/Hcj |
|---|---|---|---|
| Original Example | 1.38 | 1488.5 | 0.98 |
| Example 7 | 1.37 | 2030 | 0.97 |

Table 7 shows that the remanence of Example 7 decreases by 0.01 T, the coercivity increases by 514.5 kA/m, and the squareness changes only little.

EXAMPLE 8

A mixed slurry whose density is 4.2 $g/cm^3$ is prepared as follows:

$Pr_{82}Al_{18}$ (at %) powder whose average particle size D50 is 14 μm is used as (large) second particles 2. Dy powder whose average particle size D50 is 1 μm are used as (first) small particles 3. The viscosity of the slurry is 3800 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 2 h at 650° C. and 10 h at 900° C. After that, the magnet was cooled in the furnace and continued to heat up for 3 h at 500° C.

As to Example 8, test results of magnetic properties of the sintered NdFeB permanent magnet are shown in Table 8:

TABLE 8

| | Br (T) | Hcj(kA/m) | Hk/Hcj |
|---|---|---|---|
| Original Example | 1.38 | 1488.5 | 0.98 |
| Example 8 | 1.37 | 2006 | 0.97 |

Table 8 shows that the remanence of Example 8 decreases by 0.01 T, the coercivity increases by 517.5 kA/m, and the squareness changes only little.

EXAMPLE 9

A mixed slurry whose density is 4.3 $g/cm^3$ is prepared as follows:

$Pr_{82}Al_{18}$ (at %) powder whose average particle size D50 is 16 μm is used as (large) second particles 2. Dy powder whose average particle size D50 is 1 μm are used as (first) small particles 3. The viscosity of the slurry is 4000 CPS.

The slurry is composed of ethyl acetate (15 wt. %), ethanol (5 wt. %), polyurethane(10 wt. %), $Pr_{82}Al_{18}$powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 2 h at 650° C. and 10 h at 900° C. After that, the magnet was cooled in the furnace and continued to heat up for 3 h at 500° C.

As to Example 9, test results of magnetic properties of the sintered NdFeB permanent magnet are shown in Table 9:

TABLE 9

| | Br (T) | Hcj(kA/m) | Hk/Hcj |
|---|---|---|---|
| Original Example | 1.38 | 1488.5 | 0.98 |
| Example 9 | 1.37 | 1910.4 | 0.97 |

Table 9 shows that the remanence of Example 9 decreases by 0.01 T, the coercivity increases by 421.5 kA/m, and the squareness changes only little.

EXAMPLE 10

A mixed slurry whose density is 4.1 $g/cm^3$ is prepared as follows:

$Pr_{82}Al_{18}$ (at %) powder whose average particle size D50 is 6 μm is used as (large) second particles 2. Dy powder whose average particle size D50 is 3 μm are used as (first) small particles 3. The viscosity of the slurry is 3500 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 3 h at 450° C. and 72 h at 750° C. After that, the magnet was cooled in the furnace and continued to heat up for 3 h at 500° C.

As to Example 10, test results of magnetic properties of the sintered NdFeB permanent magnet are shown in Table 10:

TABLE 10

| | Br (T) | Hcj(kA/m) | Hk/Hcj |
|---|---|---|---|
| Original Example | 1.38 | 1488.5 | 0.98 |
| Example 10 | 1.365 | 2045.7 | 0.97 |

Table 10 shows that the remanence of Example 10 decreases by 0.015T, the coercivity increases by 557.2 kA/m, and the squareness changes only little.

EXAMPLE 11

A mixed slurry whose density is 4.1 $g/cm^3$ is prepared as follows:

$Pr_{82}Al_{18}$ (at %) powder whose average particle size D50 is 6 μm is used as (large) second particles 2. Dy powder whose average particle size D50 is 3 μm are used as (first) small particles 3. The viscosity of the slurry is 3500 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 3 h at 750° C. and 6 h at 950° C. After that, the magnet was cooled in the furnace and continued to heat up for 3 h at 500° C.

As to Example 11, test results of magnetic properties of the sintered NdFeB permanent magnet are shown in Table 11:

TABLE 11

| | Br (T) | Hcj(kA/m) | Hk/Hcj |
|---|---|---|---|
| Original Example | 1.38 | 1488.5 | 0.98 |
| Example 11 | 1.365 | 2021.8 | 0.97 |

Table 11 shows that the remanence of Example 11 decreases by 0.015T, the coercivity increases by 533.3 kA/m, and the squareness changes only little.

EXAMPLE 12

A mixed slurry whose density is 4.1 g/cm$^3$ is prepared as follows:

$Pr_{82}Al_{18}$ (at %) powder whose average particle size D50 is 6 μm is used as (large) second particles 2. Dy powder whose average particle size D50 is 3 μm are used as (first) small particles 3. The viscosity of the slurry is 3500 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 35 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 3 h at 550° C. and 15 h at 920° C. After that, the magnet was cooled in the furnace and continued to heat up for 3 h at 500° C.

As to Example 12, test results of magnetic properties of the sintered NdFeB permanent magnet are shown in Table 12:

TABLE 12

| | Br (T) | Hcj(kA/m) | Hk/Hcj |
|---|---|---|---|
| Original Example | 1.38 | 1488.5 | 0.98 |
| Example 12 | 1.365 | 2069.6 | 0.96 |

Table 12 shows that the remanence of Example 12 decreases by 0.015T, the coercivity increases by 581.1 kA/m, and the squareness changes only little.

EXAMPLE 13

A mixed sluny whose density is 4.1 g/cm$^3$ is prepared as follows:

$Pr_{82}Al_{18}$ (at %) powder whose average particle size D50 is 6 μm is used as (large) second particles 2. Dy powder whose average particle size D50 is 3 μm are used as (first) small particles 3. The viscosity of the slurry is 3500 CPS.

The slurry is composed of ethyl acetate (15 wt. %), ethanol (5 wt. %), polyurethane(10 wt. %), $Pr_{82}Al_{18}$powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 20 Hz. After 1 minute of vibration, the sluny is dried at 120° C. Another surface in the direction of c-axis is also coated with the slurry and is treated in the same way.

The NdFeB sintered permanent magnet covered with the dried film of the slurry was sent to a sintering furnace for 1 h at 750° C. and 6 h at 950° C. After that, the magnet was cooled in the furnace and continued to heat up for 3 h at 500° C.

As to Example 13, test results of magnetic properties of the sintered NdFeB permanent magnet are shown in Table 13:

TABLE 13

| | Br (T) | Hcj(kA/m) | Hk/Hcj |
|---|---|---|---|
| Original Example | 1.38 | 1488.5 | 0.98 |
| Example 13 | 1.36 | 1990 | 0.97 |

Table 13 shows that the remanence of Example 13 decreases by 0.02 T, the coercivity increases by 501.5 kA/m, and the squareness changes only little.

EXAMPLE 14

A mixed slurry whose density is 4.1 g/cm$^3$ is prepared as follows:

$Pr_{n}Al_{is}$ (at %) powder whose average particle size D50 is 6 μm is used as (large) second particles 2. Dy powder whose average particle size D50 is 3 μm are used as (first) small particles 3. The viscosity of the slurry is 3500 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 50 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 3 h at 450° C. and 72 h at 750° C. After that, the magnet was cooled in the furnace and continued to heat up for 3 h at 500° C.

As to Example 14, test results of magnetic properties of the sintered NdFeB permanent magnet are shown in Table 14:

TABLE 14

| | Br (T) | Hcj(kA/m) | Hk/Hcj |
|---|---|---|---|
| Original Example | 1.38 | 1488.5 | 0.98 |
| Example 14 | 1.36 | 2006 | 0.97 |

Table 14 shows that the remanence of Example 14 decreases by 0.02 T, the coercivity increases by 517.5 kA/m, and the squareness changes only little.

EXAMPLE 15

A mixed slurry whose density is 4.1 g/cm$^3$ is prepared as follows:

$Pr_{82}Al_{18}$ (at %) powder whose average particle size D50 is 6 μm is used as (large) second particles 2. Dy powder whose average particle size D50 is 3 μm are used as (first) small particles 3. The viscosity of the slurry is 3500 CPS.

The slurry is composed of ethyl acetate (15 wt. %), ethanol (5 wt. %), polyurethane(10 wt. %), $Pr_{82}Al_{18}$ powder (10 wt. %), Dy powder (60 wt. %)

A sintered type NdFeB permanent magnet with a volume of 20×20×5T is coated with the slurry. The surface in the direction of c-axis of the magnet should be close to the slurry and the coating has a thickness of 30 μm. The vertical vibration frequency applied to the coated magnet is 10 Hz. After 1 minute of vibration, the slurry is dried at 120° C. Another surface in the direction of c-axis is also coated with the slurry and is treated in the same way.

The NdFeB sintered permanent magnet covered with the dried film of the slurry was sent to a sintering furnace for 3 h at 450° C. and 72 h at 750° C. After that, the magnet was cooled in the furnace and continued to heat up for 3 h at 500° C.

As to Example 15, test results of magnetic properties of the sintered NdFeB permanent magnet are shown in Table 15:

TABLE 15

| | Br (T) | Hcj(kA/m) | Hk/Hcj |
|---|---|---|---|
| Original Example | 1.38 | 1488.5 | 0.98 |
| Example 15 | 1.37 | 1950.2 | 0.97 |

Table 15 shows that the remanence of Example 15 decreases by 0.01 T, the coercivity increases by 416.7 kA/m, and the squareness changes only little.

COMPARATIVE EXAMPLE 1

Comparative Example 1 is different from Example 5:

They have the same coating method, but they have different technique. That is to say, the sintered type NdFeB permanent magnets of Comparative Example 1 are only on aging treatment without low and high temperature diffusion.

For comparative Example 1 are compared with Example 5, test results of magnetic properties of sintered NdFeB permanent magnet are shown in Table 16

TABLE 16

| | Br (T) | Hcj(kA/m) | Hk/Hcj |
|---|---|---|---|
| Example 5 | 1.36 | 2085.5 | 0.97 |
| Comparative Example 1 | 1.37 | 1568 | 0.97 |

It can be seen from Table 16 that, the NdFeB sintered permanent magnet covered with the composite film diffusion source after aging treatment, the Br(remanence) decreases by 0.01 T, the coercivity of Example 5 are much bigger than comparative Example 1 and the squareness has no change.

It can be seen from the above examples that the coercivity of sintered permanent NdFeB magnet can be significantly improved, whereby the remanence is reduce only very little.

The invention claimed is:

1. A method for increasing the coercivity of a sintered type NdFeB permanent magnet, the method comprising the following steps:

a) coating of a slurry on a surface of the sintered type NdFeB permanent magnet, the slurry comprising first particles (3) consisting of Dy, the first particles (3) having an average particle diameter of 0.5 μm to 75 μm, and second particles (2) consisting of $Pr_{82}Al_{18}$ (at %), the second particles (2) having an average particle diameter of 0.5 μm to 150 μm, wherein a ratio of the average particle diameter of the second particles (2) to the average particle diameter of the first particles (3) is in the range of 2:1 to 20:1;

b) performing a vibration of the coated magnet in vertical direction of the applied slurry with a vibration frequency of in the range of 10 Hz to 50 Hz for a duration of 30s to 5 min, then drying the slurry; and c) performing a thermally induced grain boundary diffusion process.

2. The method of claim 1, wherein the slurry has a viscosity in the range of 100 CPS to 4000 CPS measured by a rotational viscosimeter at 20° C.

3. The method of claim 2, wherein the slurry has a density in the range of 2.0 to 5.0 g/cm$^3$.

4. The method of claim 3, wherein the drying in step b) is performed at a temperature of 0° C. to 180° C.

5. The method of claim 4, wherein the grain boundary diffusion process of step c) includes a first heat treatment step at 450° C. to 750° C. for 1h to 3h, a second heat treatment step at 750° C. to 950° C. for 6h to 72h, and an aging step at 40° C. to 650° C. for 3h to 15h.

6. The method of claim 1, wherein the slurry has a density in the range of 2.0 to 5.0 g/cm$^3$.

7. The method of claim 1, wherein the drying in step b) is performed at a temperature of 0° C. to 180° C.

8. The method of claim 1, wherein the grain boundary diffusion process of step c) includes a first heat treatment step at 450° C. to 750° C. for 1h to 3h, a second heat treatment step at 750° C. to 950° C. for 6h to 72h and an aging step at 400° C. to 650° C. for 3h to 15h.

* * * * *